Jan. 14, 1936. E. F. HAUSERMAN ET AL Re. 19,822

METALLIC WALL STRUCTURE

Original Filed Aug. 20, 1928 3 Sheets-Sheet 1

Inventors
EARL F. HAUSERMAN
LEROY D. MOWERY
JOHN A. BOHNSACK
By Fay Oberlin & Fay Attorneys Jan. 14, 1936. E. F. HAUSERMAN ET AL Re. 19,822

METALLIC WALL STRUCTURE

Original Filed Aug. 20, 1928 3 Sheets-Sheet 2

Inventors
EARL F. HAUSERMAN
LEROY D. MOWERY
JOHN A. BOHNSACK
By Fay Oberlin + Fay
Attorneys Jan. 14, 1936. E. F. HAUSERMAN ET AL Re. 19,822

METALLIC WALL STRUCTURE

Original Filed Aug. 20, 1928 3 Sheets-Sheet 3

Inventors
EARL F. HAUSERMAN
LEROY D. MOWERY
JOHN A. BOHNSACK
By Fay Oberlin & Fay
Attorneys Reissued Jan. 14, 1936

Re. 19,822

UNITED STATES PATENT OFFICE 19,822

METALLIC WALL STRUCTURE

Earl F. Hauserman, Cleveland Heights, Leroy D. Mowery, Cleveland, and John A. Bohnsack, Cleveland Heights, Ohio, assignors to The E. F. Hauserman Company, Cleveland, Ohio, a corporation of Ohio Original No. 1,842,094, dated January 19, 1932, Serial No. 360,234, May 3, 1929, which is in turn a division of Serial No. 300,634, August 20, 1928, now Patent No. 1,856,995, which was in turn a division of Serial No. 134,110, September 7, 1926, now Patent No. 1,681,805. This application for reissue February 18, 1935, Serial No. 7,150

13 Claims. (Cl. 189—34)

This invention relating, as indicated, to wall structures has more particular reference to construction adaptable to interior use, and it is among the objects of the invention to provide a construction which is substantial and yet not of great weight, and which may be readily assembled or disassembled at will. Other objects will appear as the description proceeds.

To the accomplishment of the foregoing and related ends, the invention, then, consists of the means hereinafter fully described, and particularly pointed out in the claims, the annexed drawing and the following description setting forth in detail certain features embodying the invention, such disclosed means constituting, however, but few of various forms in which the principle of the invention may be used.

In said annexed drawings:—

Figure 1:
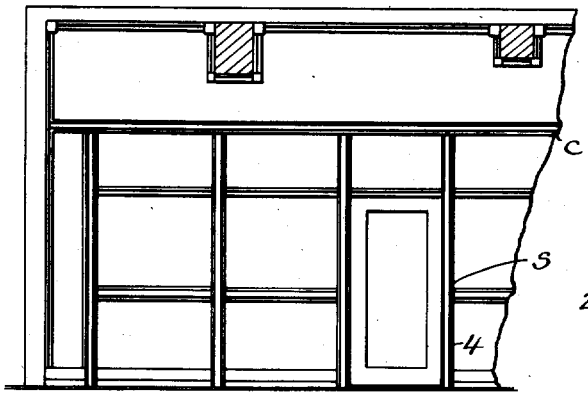
Figure 2:
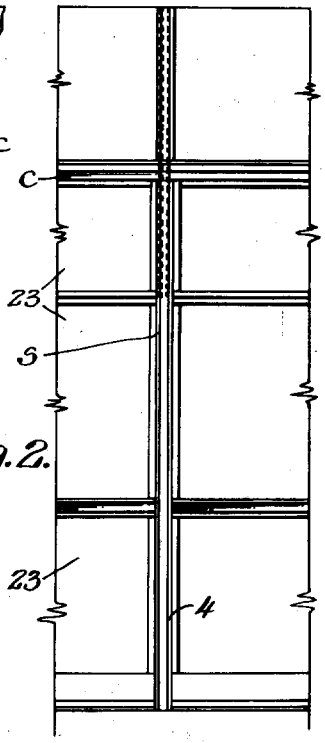
Figure 3:
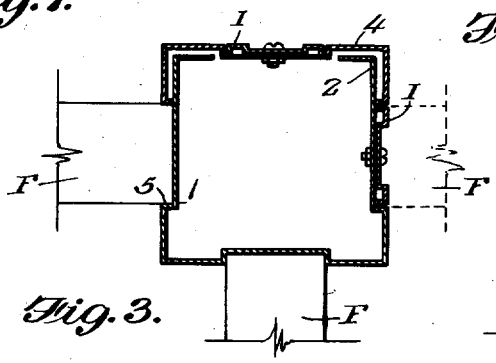
Figure 4:
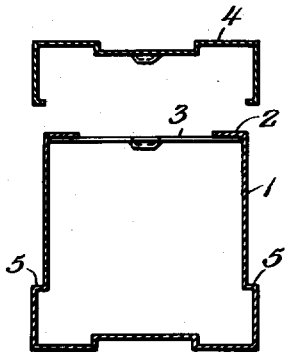
Figure 5:
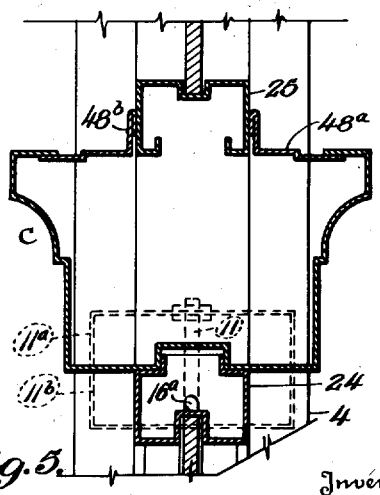
Figure 6:
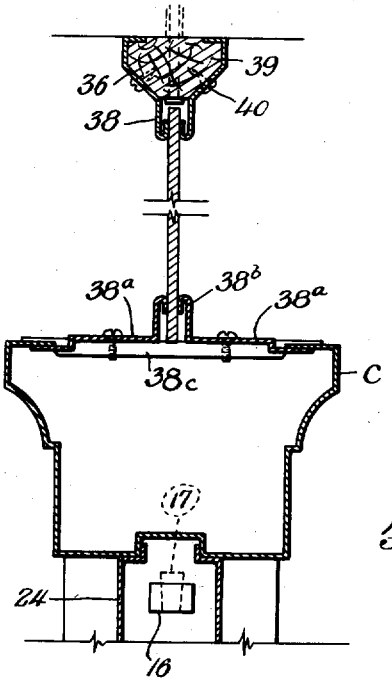
Figure 7:
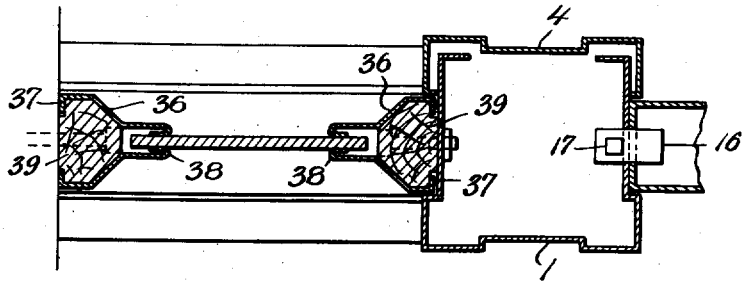
Figures 8, 9:
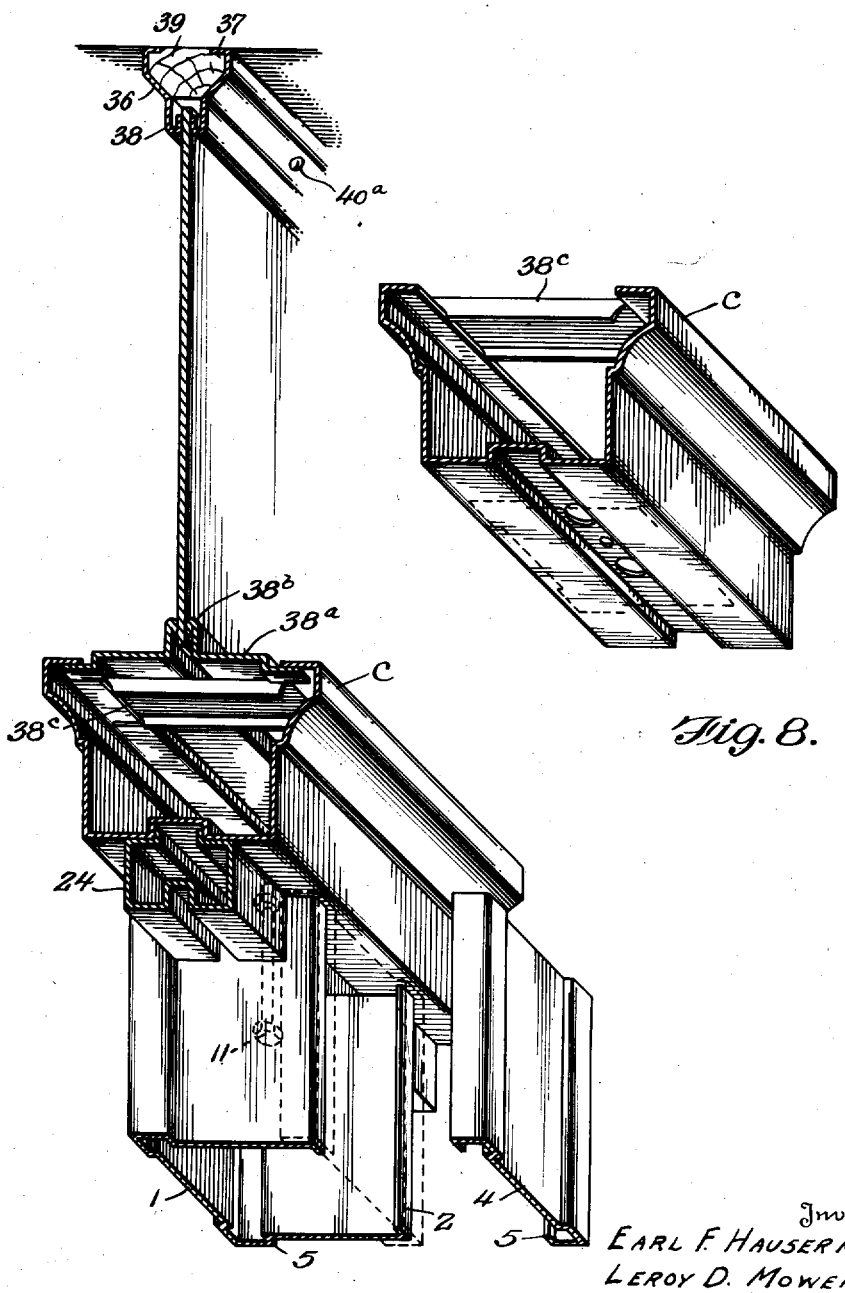

Fig. 1 is a front elevation of a partition or wall made in accordance with the present invention; Fig. 2 is a fragmentary elevation on slightly larger scale showing certain details; Fig. 3 is a transverse section of a support; Fig. 4 is a similar section of a disassembled support; Figs. 5, 6 and 7 are details in section; Fig. 8 is an isometric view of the cornice member of Figs. 1, 2, 5 and 6, isolated from the surrounding members; and Fig. 9 is an isometric view of the construction of Fig. 6.

The support or post members S are made up in general rectangular cross section, and of longitudinal channel-form, for example a sheet metal channel piece 1 preferably having its margins 2 braced by ties 3 at spaced intervals, these being welded or riveted or the like, and a post cap or face plate 4 being arranged to engage, being secured to the support member or to the ties. A convenient mode of fastening is by screws or bolts in the face plate and ties. Shoulders or abutments 5, preferably integral, are arranged on the support member, and advantageously also on the face plate, and where symmetrically provided all around, these add to the utility and to the appearance, it being possible to assemble partition filler members F in whatever direction required, and additional ornamental inserts I may be applied where desired. These inserts may be of shallow channel strip, and suitable holding means, for instance screws or bolts may be used to secure them in place.

A cornice C will ordinarily be arranged on the supports or posts, and the latter may terminate at the cornice or there may be splices or extensions thereabove, the latter arrangement being advisable at least at intervals in rather long stretches of partition.

The filler or panel members may vary somewhat in detail, depending upon the particular needs at any given place, but ordinarily are interchangeable units, and in one advantageous form these will comprise channeled sheet metal members. In the opposing faces of the respective members are grooves or recesses for receiving a panel stretcher member 23. This latter may be of sheet metal of suitable character and thickness or in some instances may be laminated or of fiber composition or glass or wire mesh.

Preferably the panels are of a standardized character and capable of assembly in vertical series or in horizontal series to any extent required, and for this the horizontal frame elements 24, etc. are provided with edge flanges allowing the building up of section upon section, and section to cornice, in interlocking manner, as shown more particularly in our Patent No. 1,856,995. A similar type of interengaging means may be applied on the vertical frame members if desired, but it is preferable to employ the posts, heretofore described, in assembling in horizontal series. In order to secure the panels to the supports or posts, particularly where adjacent to a cornice, take-up securing means, such as clips 16 and wedges 17 may be used, or angle-bolts 16a (Figs. 5, 6 and 7), the hook end of the clip or of the bolt being engaged with the frame element of the panel by being hooked thereinto through aligned holes by manipulation from the inside of the post when the face plate 4 is off, the wedge-receiving end of the clip or nut-receiving end of the bolt being thus accessible to receive the wedge or nut in tightening relation against the inner wall of the post.

The cornice C rests upon the top of the posts, and may be secured by bolts 11 through opposed brackets 11a and 11b in the cornice and post respectively (Fig. 5), or by brackets extending from the cornice being positioned back of and held by a wedge and clip.

Where the nature of the space is such as not to allow the use of panel or filler members of a standard size, we may cut the end filler member to any dimension required and secure it in place by frame elements of the character described, or in some instances, more conveniently these may be made up of beveled sheet metal strips 36 (Figs. 6, 7), having flanges 37 and longitudinal tongues 38, the latter to engage the filler member therebetween. These bevel strips 36 may be conveniently placed over form blocks 39 of wood or the like and screws 40a may be used if desired to further secure the strips thereto. A top filler member where used above a cornice is desirably mounted in this manner, as shown more in detail in Fig. 6, the top of the cornice C carrying angled strips 38a secured to the cornice member by screws in a bridge member 38c or by other desired fastening means and having opposed longitudinal tongues 38b for engaging the filler member. In this manner the space within the cornice C is readily available as a chaseway for wires. Where glass is particularly the filler element, it is usually desirable to employ horizontal frame members 24, 25, the latter being carried between angle strips 48a which may be secured to the cornice C.

As will thus be seen, the construction as a whole presents a versatility of assemblage which allows of adequately meeting the various conditions which may exist for any particular stretch of wall or partition since the supports can be provided to a standard form to be assembled in vertical or horizontal series or both, to the extent desired, and supplemented where necessary by extensions of uniform type and the panel or filler members may be of size and form required, and thinner or thicker, opaque or transparent as preferred for each particular part of the area. It will be understood also that wire mesh or grating may also be used in this relation as the panel or stretcher element of a filler portion.

This application is a division of our application Serial No. 300,634, filed August 20, 1928, (now Patent No. 1,856,995), which was in turn a division of our application Serial No. 134,110, filed September 7, 1926, (now Patent No. 1,681,805).

Other modes of applying the principle of this invention may be employed instead of that explained, change being made as regards the features herein disclosed, provided the means stated by any of the following claims or the equivalent of such stated means be employed.

We therefore particularly point out and distinctly claim as our invention:—

1. In partition construction, a sheet metal cornice of generally channel shape having upstanding flange portions rebent inwardly to define a longitudinal opening and having a recess in its web portion, a hollow support member abutting the web portion of said cornice and having a removable face member providing access to the under surface of the cornice, and a panel member abutting said support and engaged in the aforementioned recess.

2. In partition construction, a sheet metal cornice of generally channel shape, having molded flanges with edges rebent horizontally, a vertical filler sheet above said cornice, and means for positioning said filler sheet, said means including upstanding tongues carried by said cornice.

3. In partition construction, the combination of a hollow sheet metal cornice of generally channel shape, having molded flanges with edges rebent horizontally, strips adapted to be secured to the top of said cornice to present parallel longitudinal tongues, a hollow sheet metal frame member also having parallel longitudinal tongues, and a stretcher adapted to extend between the two sets of tongues.

4. In partition construction, a self-contained cornice finish embodying a continuous sheet metal cornice member of generally channel shape having its web portion extending integrally across into molded flanges with edges rebent horizontally to present an opening, and spaced apart tie means bridging such opening without obstruction thereabove.

5. In partition construction, a series of aligned panel members, and thereabove a continuous sheet metal cornice member of generally channel shape having its web portion extending integrally across into flange portions with the edges of its flange portions rebent inwardly to define a longitudinal opening along the top, tie bars bridging such opening at spaced intervals. and a recess in the lower side adapted to engage the said panel members.

6. In partition construction, the combination of a panel member, a plurality of hollow vertical support members having removable faces to permit access to their interior, and a sheet metal cornice adapted to align said support members and having a longitudinal recess along the lower side to receive said panel member and means for removably securing said cornice to said supports, said means passing through said recess and being accessible from the interior of said supports.

7. In partition construction, a sheet metal cornice of generally channel shape having upstanding flange portions rebent inwardly to define a longitudinal opening bridged by spaced ties, and having a recess in its web portion, a hollow support member abutting the web portion of said cornice and having a removable face member providing access to the under surface of the cornice, a panel member abutting said support and engaged in the aforementioned recess, and removable securing means passing through such recess into the interior of said hollow accessible post.

8. In partition construction, the combination of a panel member having a top horizontal with upstanding flanges, and a sheet metal cornice member extending continuously over a series of such panels with upstanding sides rebent inwardly, a top filler supported by said cornice, and a recess in the lower side of the cornice without interruption of its continuity transversely for receiving the upstanding flanges of said panel member.

9. In partition construction, a continuous sheet metal cornice of generally channel shape having upstanding flange portions rebent inwardly to define a longitudinal opening and having a recess in its web portion, hollow vertical support means abutting the web portion of said cornice and having a removable face member providing access to the under surface of the cornice, and a panel member abutting said support and engaged in the aforementioned recess.

10. In partition construction, panel members, hollow channel verticals associated with adjacent panel members, removable faces providing covers for said verticals, a sheet metal cornice extending continuously thereabove, a top filler supported by said cornice, said cornice having a longitudinal recess along the lower side adapted to receive the panel members and align the channel verticals, and means for removably securing said cornice to said verticals, such means being accessible by reason of such removable face cover.

11. In partition construction, the combination of a continuous sheet metal cornice member of generally channel shape having upstanding molded flanges with edges rebent inwardly; a bridge member between such flanges; a top filler supported on said bridge member; and a panel member abutting the web portion of such cornice member, one member having a recess to receive the other, whereby the cornice member serves to align a series of such panel members.

12. In partition construction, the combination of a continuous sheet metal cornice member of generally channel shape having upstanding molded flanges with edges further rebent inwardly to present a longitudinal opening; tie members bridging such opening at intervals; such ties being provided with abutting portions to serve as gaging means for dimensioning the flanges, and a panel member abutting the web portion of such cornice member, one member having a recess to receive the other whereby the cornice member serves to align a series of such panel members.

13. In partition construction, the combination of a continuous sheet metal cornice member of generally channel shape having upstanding molded flanges with edges further rebent inwardly to present a longitudinal opening; tie members bridging such opening at spaced intervals and superposed partition or filler structure supported by such ties, and a panel member abutting the web portion of such cornice member, one member having a recess to receive the other whereby the cornice member serves to align a series of such panel members.

EARL F. HAUSERMAN.
LEROY D. MOWERY.
JOHN A. BOHNSACK.